US012447757B2

(12) United States Patent
Toyoizumi

(10) Patent No.: US 12,447,757 B2
(45) Date of Patent: Oct. 21, 2025

(54) INKJET PRINTING APPARATUS, SHEET DRYING APPARATUS, AND SHEET DRYING METHOD

(71) Applicant: Konica Minolta, Inc., Tokyo (JP)

(72) Inventor: Teruhiko Toyoizumi, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 301 days.

(21) Appl. No.: 18/307,188

(22) Filed: Apr. 26, 2023

(65) Prior Publication Data

US 2023/0382133 A1 Nov. 30, 2023

(30) Foreign Application Priority Data

May 31, 2022 (JP) ................................ 2022-088451

(51) Int. Cl.
*B41J 11/00* (2006.01)

(52) U.S. Cl.
CPC .... *B41J 11/00212* (2021.01); *B41J 11/00214* (2021.01); *B41J 11/00216* (2021.01)

(58) Field of Classification Search
CPC .............. B41J 11/0021; B41J 11/00212; B41J 11/00214; B41J 11/00216; B41J 11/00218; B41J 11/0022; B41J 11/00222; B41J 11/00224; B41J 11/007; B41J 11/0085; B41J 29/377; B41J 29/12; B41J 2203/01; B41J 2203/011; B41J 13/08; B65H 2301/517; B65H 2301/5143; B65H 2301/51432
See application file for complete search history.

(56) References Cited

U.S. PATENT DOCUMENTS

| | | | | |
|---|---|---|---|---|
| 9,623,676 | B2 * | 4/2017 | Sasaki | B41J 11/00222 |
| 9,798,278 | B2 * | 10/2017 | Nagayama | B41J 11/0015 |
| 2006/0170726 | A1 * | 8/2006 | Hirakawa | B41M 7/00 347/21 |
| 2009/0244147 | A1 * | 10/2009 | Ohtsu | B41J 11/00244 347/14 |
| 2010/0208021 | A1 * | 8/2010 | Hori | G03G 15/2064 347/102 |

(Continued)

FOREIGN PATENT DOCUMENTS

| | | |
|---|---|---|
| JP | 08-290560 | 11/1996 |
| JP | 2006-192780 | 7/2006 |

(Continued)

OTHER PUBLICATIONS

Translation of WO 2018207534 A1 (Year: 2025).*

*Primary Examiner* — Leslie J Evanisko
*Assistant Examiner* — Thomas Ray Knief
(74) *Attorney, Agent, or Firm* — BakerHostetler

(57) ABSTRACT

An inkjet printing apparatus comprises: a conveyance section that conveys a cut sheet; an ink ejection section that ejects an ink to form an image when the sheet passes a predetermined position; a first heat source that is provided on a downstream side of the ink ejection section and dries an ink ejection face of the sheet; and a second heat source that is arranged to face the first heat source and comes into contact with a back surface of the sheet opposite to the ink ejection face to heat the sheet. The first heat source emits an electromagnetic wave to heat the ink ejection face by radiant heat.

13 Claims, 7 Drawing Sheets

(56) References Cited

U.S. PATENT DOCUMENTS

| | | | | |
|---|---|---|---|---|
| 2020/0290383 | A1* | 9/2020 | Ishihara | G03G 15/2021 |
| 2021/0197585 | A1* | 7/2021 | Hase | B41J 3/60 |
| 2021/0370692 | A1* | 12/2021 | Sawase | B41J 11/00242 |

FOREIGN PATENT DOCUMENTS

| | | | |
|---|---|---|---|
| JP | 2021-046272 | | 3/2021 |
| WO | WO-2018207534 | A1 * | 11/2018 |

* cited by examiner

FIG. 5

REFERENCE INFORMATION 63

| INK TYPE | SHEET TYPE | INK AMOUNT | FIRST HEAT SOURCE | SECOND HEAT SOURCE |
|---|---|---|---|---|
| WATER-BASED INK | THICK PAPER | LARGE | 10kW | 20kW |
| | | SMALL | 5kW | 15kW |
| | THIN PAPER | LARGE | 8kW | 10kW |
| | | SMALL | 5kW | 10kW |
| SOLVENT-BASED INK | THICK PAPER | LARGE | 6kW | 12kW |
| | | SMALL | 3kW | 9kW |
| | THIN PAPER | LARGE | 4kW | 5kW |
| | | SMALL | 3kW | 5kW |
| | | | | |

INKJET PRINTING APPARATUS, SHEET DRYING APPARATUS, AND SHEET DRYING METHOD

CROSS-REFERENCE TO RELATED APPLICATIONS

This application claims priority to Japanese patent application No. 2022-088451 filed on May 31, 2022, the entire disclosure of which is incorporated herein by reference in its entirety.

BACKGROUND

Technological Field

The present invention relates to an inkjet printing apparatus, a sheet drying apparatus, and a sheet drying method. The present invention particularly relates to a technique for forming an image on a cut sheet by an inkjet method and then heating the sheet to dry and fix an ink on the sheet.

Description of the Related Art

An inkjet printing apparatus that forms an image by ejecting an ink onto a sheet fixes the ink onto the sheet by performing a drying step after ejecting the ink onto the sheet. In the drying step, a process of heating the sheet to dry the ink is performed.

In recent years, there has been a demand for an increase in sheet conveyance speed in this type of inkjet printing apparatus. The sheet on which the image is formed with the ink passes through the section of the drying process in a short time. Therefore, the amount of heat required for drying the ink has increased.

In addition, in recent years, there has been an increasing demand for water-based inks rather than solvent-based inks from the viewpoint of environmental problems and the like. The water-based ink has a higher quantity of heat required for drying than the solvent-based ink. Therefore, in a case where water-based ink is used, the sheet needs to be heated with a higher amount of heat.

Conventionally, there has been proposed an inkjet printing apparatus configured to increase an amount of heat by heating a sheet from both front and back surfaces of the sheet. This known technique is introduced for example in Japanese Patent Application Laid-Open No. JP 2021-46272 A (hereafter, document 1). The following two configurations are applied in the known technique, a configuration in which the back surface side of a roll-shaped printing sheet is held in close contact with a heating-type conveyance belt and the back surface of the printing sheet is heated; and a configuration in which hot air is blown to the front surface side of the printing sheet to dry ink with hot air.

Also, a technique of winding printing sheet around a heat roller and heating a back surface of the printing sheet by the heat roller to dry ink has conventionally been proposed. This known technique is introduced for example in Japanese Patent Application Laid-Open No. JP H08-290560 a (hereafter, document 2)

According to the known technique in document 1, the sheet onto which the ink is ejected is constituted by a roll-shaped printing sheet. In a case of the roll-shaped sheet, a constant tension is applied in a conveyance direction of the sheet. Therefore, there is no problem even if hot air is blown to the front surface side of the sheet from above.

However, there is a case where the sheet is not in a roll shape but is a sheet cut into a predetermined size such as a A4 size, for example. In this case, if hot air is blown to dry the ink, the sheet is lifted from a heating-type conveyance belt. Then, there is a problem that the sheet conveyance is not normally performed and a jam tends to occur. In addition, when the sheet floats from the heating-type conveyance belt, the back surface side of the sheet is not normally heated. Therefore, the front and back surfaces of the sheet cannot be uniformly heated. In this case, there is a possibility that the sheet is deformed due to occurrence of curl caused by a temperature difference, for instance. There is a problem that the quality of a printed matter is deteriorated.

Further, according to the known technique in document 2, since only the back surface of the sheet is heated, both the front and back surfaces of the sheet are not uniformly heated. In this case, there is a possibility that the sheet is deformed due to occurrence of curl caused by a temperature difference, for instance.

SUMMARY

The present invention is intended to solve the above problems. Thus, the present invention is intended to provide an inkjet printing apparatus, a sheet drying apparatus, and a sheet drying method capable of efficiently drying ink while normally continuing sheet conveyance without deforming a sheet when drying the ink discharged to the cut sheet.

First, the present invention is directed to an inkjet printing apparatus.

To achieve at least one of the abovementioned objects, according to an aspect of the present invention, the inkjet printing apparatus reflecting one aspect of the present invention comprises: a conveyance section that conveys a cut sheet; an ink ejection section that ejects an ink to form an image when the sheet passes a predetermined position; a first heat source that is provided on a downstream side of the ink ejection section and dries an ink ejection face of the sheet; and a second heat source that is arranged to face the first heat source and comes into contact with a back surface of the sheet opposite to the ink ejection face to heat the sheet. The first heat source emits an electromagnetic wave to heat the ink ejection face by radiant heat.

Second, the present invention is directed to a sheet drying device.

To achieve at least one of the abovementioned objects, according to an aspect of the present invention, the sheet drying device reflecting one aspect of the present invention comprises: a conveyance section that conveys a cut sheet in a state in which ink is ejected to a front surface; a first heat source that heats an ink ejection face of the sheet in a state in which the sheet is being conveyed; and a second heat source that is arranged to face the first heat source and is in contact with a back surface of the sheet opposite to the ink ejection face to heat the sheet. The first heat source emits an electromagnetic wave to heat the ink ejection face by radiant heat.

Third, the present invention is directed to a sheet drying method.

According to an aspect of the present invention, the sheet drying method comprises: conveying a cut sheet in a state in which an ink ejection face to which ink is ejected faces upward; driving a first heat source arranged above the ink ejection face of the sheet to heat the ink ejection face of the sheet in a state in which the sheet is being conveyed; driving a second heat source that is arranged to be in contact with a back surface of the sheet opposite to the ink ejection face to heat the back surface of the sheet in a state in which the sheet is being conveyed. The first heat source emits an electromagnetic wave to heat the ink ejection face by radiant heat.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIG. 5 illustrates an example of reference information;

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
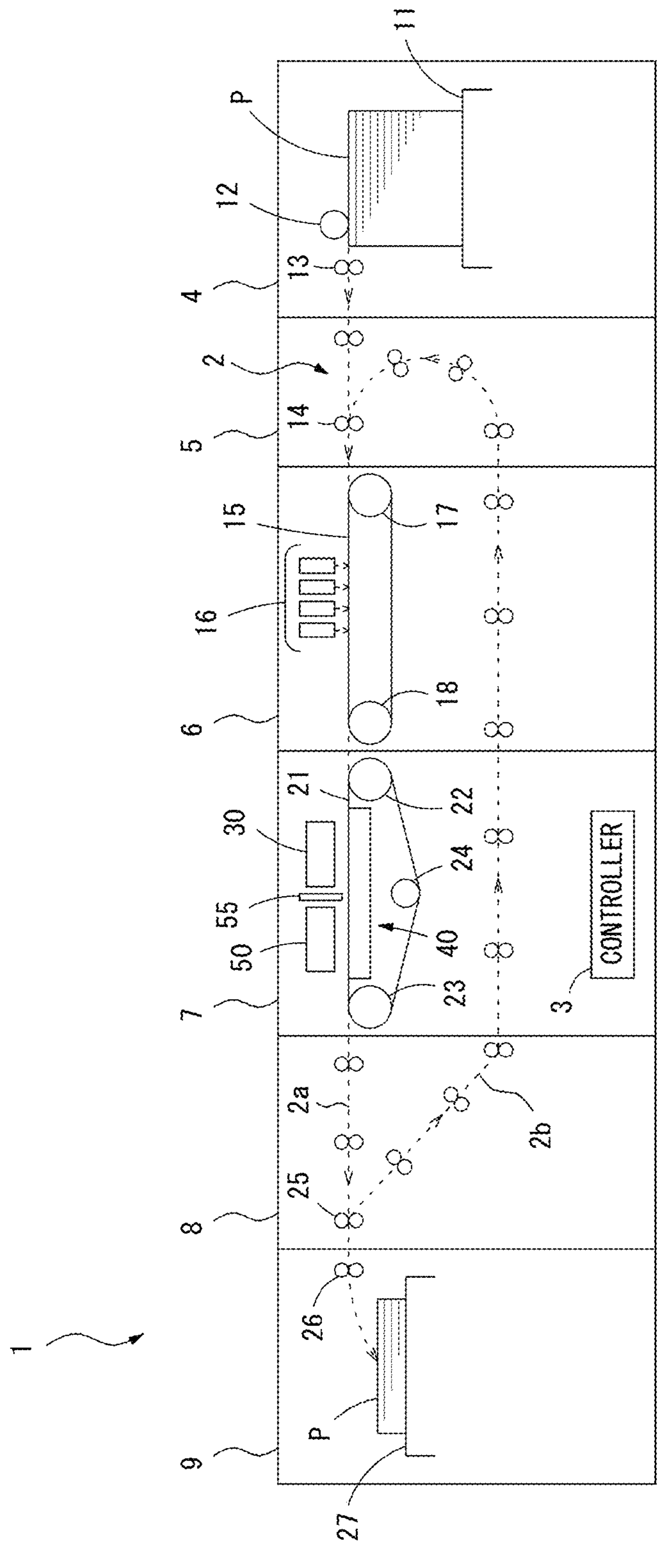
FIG. 1 illustrates an exemplary structure of an inkjet printing apparatus.

FIG. 1 illustrates an exemplary structure of an inkjet printing apparatus 1 in which the first embodiment of the present invention may be practiced. The inkjet printing apparatus 1 is an apparatus that conveys a sheet P cut in advance into a predetermined size such as a A4 size and ejects ink to form an image when the sheet P passes through a predetermined position. The inkjet printing apparatus 1 includes a sheet feed section 4, an aligning section 5, an image forming section 6, a drying section 7, a sheet reversing section 8, and a discharging section 9. The inkjet printing apparatus 1 has a structure in which a conveyance section 2 that conveys the sheet P is provided inside each of these sections. In addition, the inkjet printing apparatus 1 includes a controller 3 that controls the operation of each section.

The conveyance section 2 conveys the sheet P by performing roller conveyance using a pair of rollers or belt conveyance using a belt. Inside the inkjet printing apparatus 1, a first path 2*a* and a second path 2*b* are provided as paths for conveying the cut sheet P. The first path 2*a* is a conveyance path for forming an image on the sheet P. The second path 2*b* is a path for reversing the sheet P. The second path 2*b* is a conveyance path for reversing the front and back of the sheet P having the image formed on the first side (front side) and supplying the sheet P back to the first path 2*a*.

The sheet feed section 4 includes a tray 11, a pickup roller 12, and a sheet feed roller 13. The sheets P cut into a predetermined size such as a A4 size in advance are stacked on the tray 11. The pickup roller 12 is brought into contact with the uppermost sheet P among the plurality of sheets P stacked on the tray 11. The pickup roller 12 feeds the sheet P toward the sheet feed roller 13. The sheet feed roller 13 feeds the sheet P fed by the pickup roller 12 toward the first path 2*a*.

The aligning section 5 supplies the sheet P fed by the sheet feed section 4 to the image forming section 6. The aligning section 5 includes a timing roller 14. The aligning section 5 aligns the sheet P by enabling the leading end of the sheet P abut on the timing roller 14. Then, the aligning section 5 drives the timing roller 14 at a predetermined timing to supply the sheet P to the image forming section 6. Thus, the image forming section 6 can eject ink in synchronization with the timing at which the sheet P is supplied from the aligning section 5 to form an appropriate image on the sheet P.

The image forming section 6 includes a belt 15 and an ink ejection section 16. The belt 15 conveys the sheet P. The ink ejection section 16 ejects ink when the sheet P conveyed by the belt 15 passes a predetermined position. The image forming section 6 forms an image on the sheet P by driving the ink ejection section 16 based on image data to be printed.

The belt 15 is an endless belt and is stretched between a pair of rollers 17,18 provided on the upstream side and the downstream side. A large number of minute holes are formed on the surface of the belt 15. Air is sucked from the minute holes by a blower (not illustrated). The image forming section 6 adsorbs and holds the back surface side of the sheet P supplied from the aligning section 5 on the surface of the belt 15 and conveys the sheet P to the downstream side in the conveyance direction.

The ink ejection section 16 includes a plurality of ejection heads. Each ejection head ejects ink of each color of, for example, Y (yellow), M (magenta), C (cyan), and K (black). The ink ejection section 16 ejects the ink of each color onto the first surface (front surface) of the sheet P by individually driving each ejection head based on the image data to form a color image. For example, the ink ejected by the ink ejection section 16 may be, for example, any one of aqueous ink and non-water-based ink (including solvent-based ink, oil-based ink, and ultraviolet curable ink).

The drying section 7 is arranged on the downstream side of the image forming section 6, and functions as a sheet drying device. The drying section 7 heats the sheet P onto which the ink has been ejected by the image forming section 6 to dry and fix the ink on the sheet P. The drying section 7 includes a belt 21 that conveys the sheet P, a first heat source 30, a second heat source 40, a blower 50, and a wall 55.

The belt 21 is an endless belt and is stretched over three rollers 22, 23 and 24. A large number of minute holes are formed on the surface of the belt 21. Air is sucked from the minute holes by a blower (not illustrated). The drying section 7 attaches and holds the back surface side of the sheet P supplied from the image forming section 6 to the surface of the belt 21. The drying section 7 then conveys the sheet P to the downstream side in the conveyance direction. While the sheet P is being conveyed by the belt 21, the drying section 7 heats the sheet P to dry the ink. The detailed structure of the drying section 7 is described later.

The sheet reversing section 8 receives the sheet P with the dried ink from the drying section 7 and supplies the sheet P to the discharging section 9. Further, the sheet reversing section 8 includes a switchback roller 25. The switchback roller 25 can guide the sheet P to the second path 2*b* without supplying the sheet P to the discharging section 9. More specifically, when double-sided printing on the sheet P is designated, the switchback roller 25 supplies the sheet P from the first path 2*a* to the second path 2*b*. The second path 2*b* extends from the sheet reversing section 8 to the aligning section 5 via the drying section 7 and the image forming section 6. Therefore, the edge of the sheet P guided to the second path 2*b* is switched to the leading edge, and the sheet P is conveyed through the second path 2*b*. Then, the sheet P is conveyed along the first path 2*a* again in the aligning section 5.

The discharging section 9 includes a discharging roller 26 and a tray 27. The sheet P supplied from the sheet reversing section 8 is discharged to the tray 27 by the discharging roller 26.

As described above, the inkjet printing apparatus 1 of the first embodiment is capable of enabling the conveyance section 2 to convey the cut sheet P and forming an image on one surface or both surfaces of the sheet P with ink ejected by the ink ejection section 16.

Figure 2:
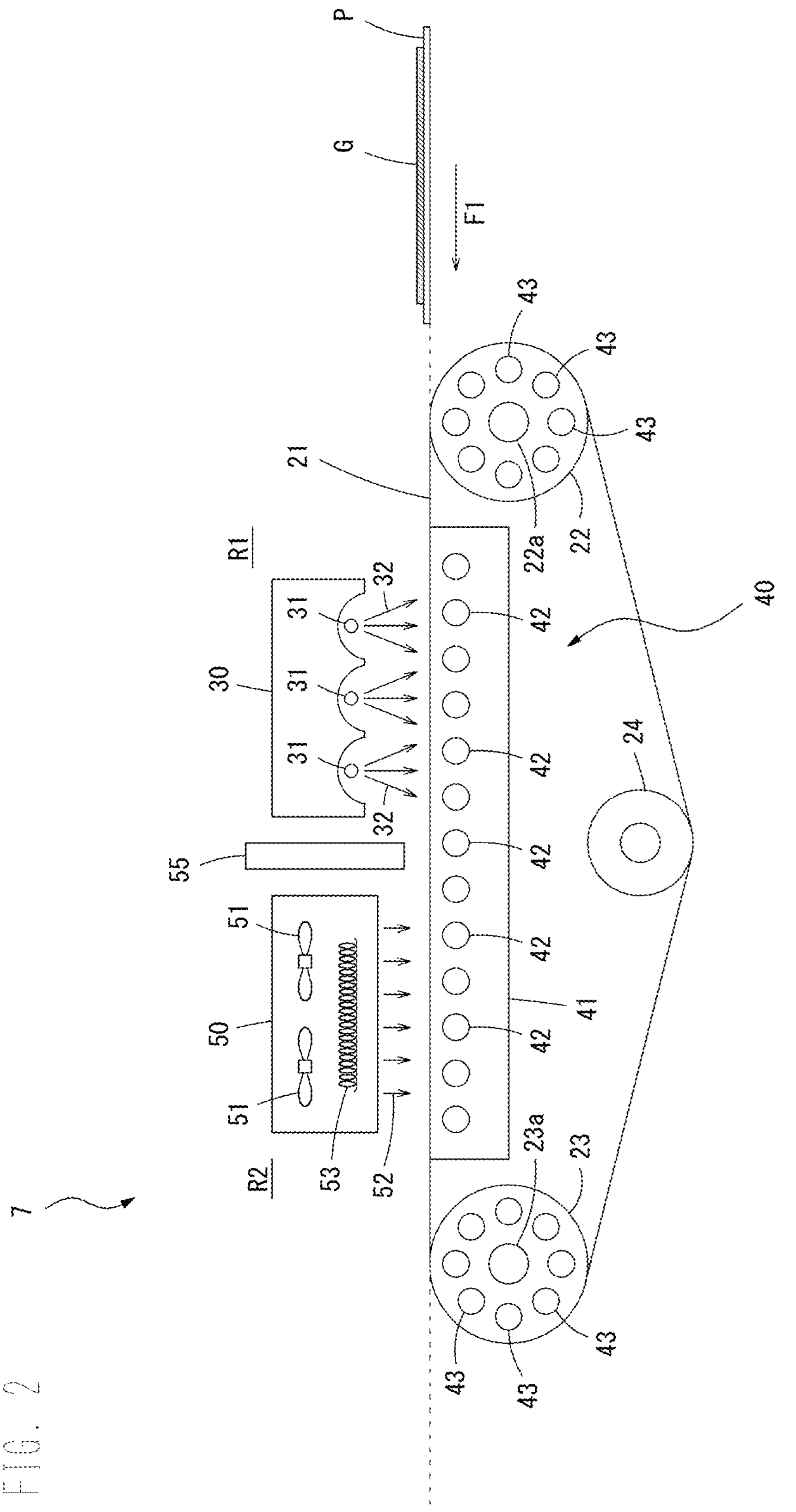
FIG. 2 illustrates a detailed exemplary structure of a drying section.

FIG. 2 illustrates a detailed exemplary structure of the drying section 7. As shown in FIG. 2, the sheet P on which an image G is formed by the image forming section 6 is conveyed to the drying section 7. The sheet P is conveyed through the drying section 7 in the direction of an arrow F1. To be more specific, the sheet P that enters the drying section 7 is attached and held on the surface of the belt 21. When the rollers 22 and 23 circularly move the belt 21, the sheet P is conveyed toward the downstream side in the conveyance direction F1.

The first heat source 30 is arranged on the upstream side in the conveyance direction F1 of the sheet P in the drying section 7. The first heat source 30 is provided at a position that faces the ink ejection face of the sheet P conveyed by the belt 21. The first heat source 30 includes a light source 31 that emits an electromagnetic wave 32. The light source 31 irradiates the electromagnetic wave 32 to the ink ejection face of the sheet P to apply radiation energy thereto, thereby heating the ink ejection surface with radiation heat. Since the ink ejection face is heated by radiant heat, a phenomenon in which the sheet P floats from the surface of the belt 21 does not occur. The belt 21 can normally continue the conveyance of the sheet P. Therefore, it is possible to reduce the possibility that a jam occurs in the drying process by the drying section 7.

The light source 31 of the first heat source 30 is, for example, a UV heater (ultraviolet lamp) that emits ultraviolet rays, a halogen heater (halogen lamp), or an infrared heater (infrared lamp). The radiation energy emitted by the light source 31 becomes larger as the wavelength of the electromagnetic wave 32 becomes shorter. Therefore, in order to efficiently heat the ink ejection face of the sheet P by radiation heat, it is most preferable to use the UV heater as the light source 31. To be more specific, using the UV heater, it is possible to increase the temperature of the ink ejection face of the sheet P to a predetermined temperature in a short time. The second most preferable light source 31 to the UV heater is the halogen heater.

The second heat source 40 is arranged facing the first heat source 30. The second heat source 40 contacts a surface (back surface) of the sheet P opposite from the ink ejection face thereof and heats the sheet P. More specifically, the drying section 7 heats both the front and back surfaces of the sheet P at the same time to prevent a temperature difference that occurs between the front and back surfaces.

The second heat source 40 includes a heat source plate 41 that is in contact with the back surface side of the belt 21 that attaches and holds the sheet P. The belt 21 slides in contact with the upper surface of the heat source plate 41 and transports the sheet P. The heat source plate 41 is, for example, a metal plate. A plurality of heaters 42 arranged at predetermined intervals along the conveyance direction F1 of the sheet P are provided inside the heat-source plate 41. The temperature of the heat source plate 41 is increased by the plurality of heaters 42, and the heat source plate 41 heats the back surface of the sheet P by heat conduction through the belt 21.

A plurality of holes for sucking air are provided on the upper surface of the heat source plate 41. Therefore, even when the belt 21 moves in a state of being in contact with the upper surface of the heat source plate 41, the sheet P is maintained in a state of being adsorbed and held on the surface of the belt 21.

As shown in FIG. 2, the second heat source 40 may employ a structure in which a heater 43 is provided inside the rollers 22 and 23. For example, the roller 22 may include the plurality of heaters 43 around the rotation axis 22*a* at predetermined angular intervals. For example, the roller 23 may include the plurality of heaters 43 around the rotation axis 23*a* at predetermined angular intervals. The heater 43 is not only provided in the heat source plate 41 but also in the rollers 22 and 23 so that the second heat source 40 can efficiently heat the belt 21 to a predetermined temperature. It is optional whether the heater 43 is provided inside the rollers 22 and 23.

The blower 50 is provided on the downstream side of the first heat source 30. The blower 50 includes an air blowing part 51 such as a fan or a blower. The blower 50 sends air 52 toward the sheet P conveyed in a state of being attached and held by the belt 21. However, the amount of air blown by the blower 50 is set to such a small amount that the sheet P attached and held on the belt 21 does not float from the belt 21. Therefore, even when the sheet P passes below the blower 50, the sheet P does not float from the belt 21. The sheet P is properly kept being attached and held by the belt 21. Accordingly, occurrence of paper jam can be restrained, and deformation such as curling of the sheet P can also be restrained.

The blower 50 is provided to promote drying of the ink ejection face heated by the first heat source 30. For example, in the case of water-based ink, when the ink ejection face is heated by the first heat source 30, moisture contained in the ink evaporates. However, when the vicinity of the ink ejection face reaches the saturated water vapor amount, the evaporation of the water content is suppressed. The blower 50 introduces outer air in the vicinity of the ink ejection face by sending the air 52 to the ink ejection face. The blower 50 prevents the vicinity of the ink ejection face from reaching a saturated vapor amount to promote drying of the ink.

Figure 3:
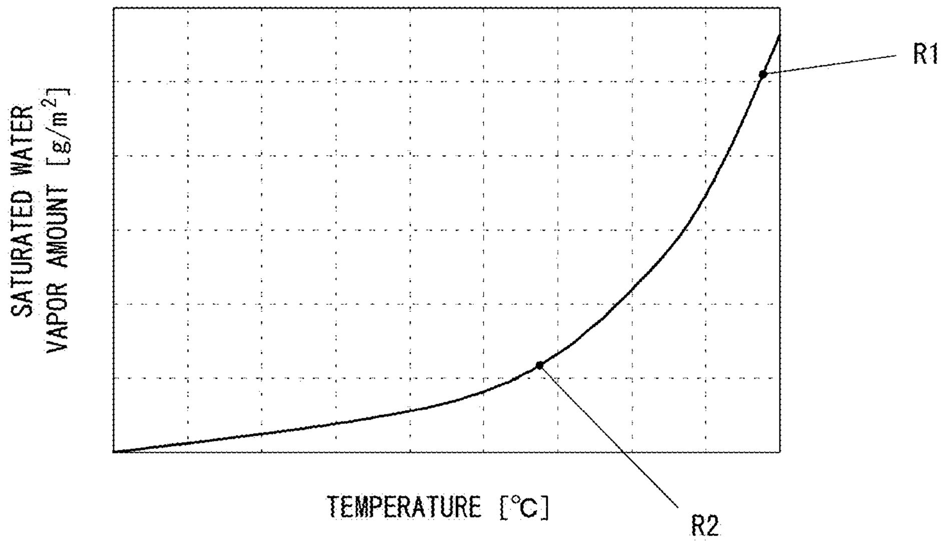
FIG. 3 illustrates a relationship between a temperature and a saturated water vapor amount.

FIG. 3 illustrates a relationship between a temperature and a saturated water vapor amount. As illustrated in FIG. 3, the saturated water vapor amount increases as the temperature increases. Conversely, the saturated water vapor amount decreases as the temperature decreases. The first heat source 30 is provided in the heating region R1. Since the heating region R1 is brought into a high-temperature state by radiant heat generated by the electromagnetic waves 32, the saturated water vapor amount becomes a large value. Therefore, when the sheet P is passing through the heating region R1, there is a low possibility that the steam amount in the vicinity of the ink ejection face reaches the saturated water vapor amount due to evaporation of the ink. In contrast, the radiant heat generated by the electromagnetic waves 32 does not exist in the air-blowing region R2 in which the blower 50 is provided. The temperature in the blowing region R2 is therefore relatively low, so that the saturated water vapor amount falls to a small value. Therefore, when the sheet P is conveyed to the downstream side of the first hear source 30, there is a possibility that the steam amount in the vicinity of the ink ejection face reaches the saturated water vapor amount due to evaporation of the ink. The blower 50 sends the air 52 to the ink ejection face. The evaporated water content exists in the vicinity of the ink ejection face is blown off and the steam amount in the vicinity of the ink ejection face is prevented from reaching the saturated water vapor amount. Thus, the ink ejection face can be dried efficiently.

As shown in FIG. 2, the blower 50 may be provided with a heater 53. The blower 50 with the heater 53 can send the air 52 having a temperature higher than a normal temperature to the ink ejection face. Thus, the saturated water vapor amount in the vicinity of the ink ejection face is enabled to be increased. The ink ejection face, therefore, can be dried further and more efficiently.

In addition, the heat source plate 41 is arranged to face not only the first heat source 30 but also the blower 50. That is, the heat source plate 41 is provided over both the heating region R1 and the blowing region R2. Therefore, the heat source plate 41 can continue to hold the sheet P at a constant temperature even during a period in which the sheet P is being conveyed through the blower 50.

The wall 55 is provided between the heating region R1 by the first heating source 30 and the blowing region R2 by the blower 50. The wall 55 is a barrier for preventing the air 52 generated by the blower 50 from flowing into the heating region R1. When the air 52 flows into the heating region R1, the air 52 becomes a cross wind, and thus there is a possibility that the sheet P conveyed in the heating region R1 is floated. The wall 55 prevents the occurrence of such cross wind and suppresses the sheet P from floating from the belt 21. The gap between the lower end of the wall 55 and the surface of the belt 21 may be at least a gap that allows the sheet P to which ink has been ejected to pass therethrough.

As described above, the first heat source 30 heats the ink ejection face of the sheet P with radiant heat. The drying section 7 is then enabled to continue normal conveyance of the sheet P without causing the sheet P to float. More specifically, the drying section 7 enables the first heat source 30 and the second heat source 40 to heat both the front and back surfaces of the sheet P at the same time. Thus, both the front and back surfaces of the sheet P is enabled to be equally heated without a temperature difference that occurs between the front and back surfaces. Therefore, the drying section 7 is configured to be able to satisfactorily prevent occurrence of a jam and deformation of the sheet P during drying of the sheet P. The drying section 7 is enabled to efficiently dry the ink by using a UV heater or a halogen heater as the light source 31 of the first heat source 30. In particular, in a case where the UV heater is used, the amount of heat to be applied during drying can be increased. Therefore, the UV heater contributes to an increase in the conveyance speed of the sheet P and has an advantage that the sheet P can be efficiently dried even in the case of water-based ink.

Figure 4:
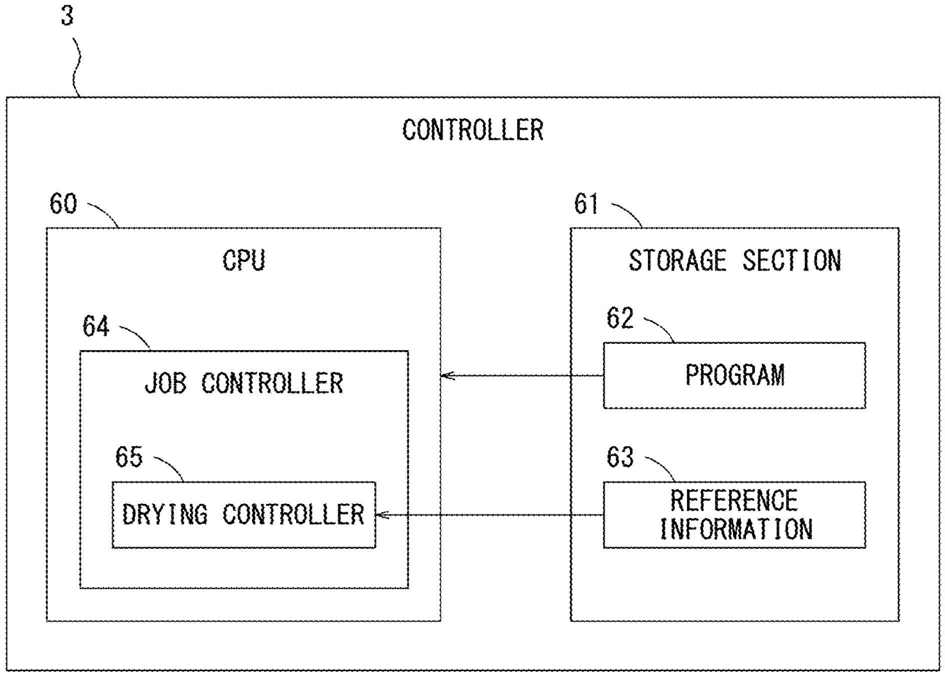
FIG. 4 illustrates an exemplary structure of a controller.

Next, a structure of the controller 3 is described. FIG. 4 illustrates an exemplary structure of the controller 3. The controller 3 includes a CPU 60 and a storage section 61. The CPU 60 is a hardware processor that reads and executes a program 62 stored in the storage section 61. The storage section 61 is a storage device formed from a device such as a hard disk drive (HDD) or a solid-state drive (SSD). The program 62 and reference information 63 are stored in advance in the storage section 61.

The CPU 60 serves as a job controller 64 by executing the program 62. The job controller 64 integrally controls the execution of a print job in the inkjet printing apparatus 1 and controls the operation of each section described above. That is, the job controller 64 controls the operation of forming an image on the sheet P based on image data to be printed. The job controller 64 includes a drying controller 65.

The drying controller 65 controls a process of drying the sheet P carried out by the drying section 7. To be more specific, the drying controller 65 controls the operations of the first heat source 30, the second heat source 40, and the blower 50. In particular, the drying controller 65 can adjust the amount of heat applied to the sheet P by controlling each of the first heat source 30 and the second heat source 40. At this time, the drying controller 65 reads the reference information 63 stored in the storage section 61. The drying controller 65 then controls each of the first heat source 30 and the second heat source 40 based on the reference information 63.

FIG. 5 is a diagram illustrating an example of reference information 63. As illustrated in FIG. 5, an ink type, a sheet type, and a control parameter (heat amount) are recorded in the reference information 63. The control parameter (heat amount) is used when the first heat source 30 and the second heat source 40 are controlled in accordance with each amount of ink discharged to the sheet P. For example, in the case of a water-based ink, the amount of heat required for drying is larger than that of a solvent-based ink (non-water-based ink). Therefore, the amount of heat applied by each of the first heat source 30 and the second heat source 40 is set to be higher than that of the solvent-based ink. In a case of a thick paper, the amount of heat required for drying is larger than that of a thin paper. Therefore, the amount of heat applied by each of the first heat source 30 and the second heat source 40 is set to be higher than that of the thin paper. Further, in a case where the amount of ink is large, the amount of heat required for drying the ink is larger compared to a case where the amount of ink is small. Thus, the amount of heat applied by each of the first heat source 30 and the second heat source 40 is set to be higher than that of the case where the amount of ink is small.

Further, the first heat source 30 directly heats the surface of the sheet P with radiant heat. Therefore, the temperature gradient on the surface of the sheet P is relatively steep. On the other hand, the second heat source 40 heats the back surface of the sheet P by heat conduction through the belt 21. Therefore, the temperature gradient on the surface of the sheet P is relatively gentle. In order to control the generation of the temperature difference due to the temperature gradient difference, it is set in the reference information 63 that the amount of heat applied by the second heat source 40 to be higher than that applied by the first heat source 30.

The drying controller 65 determines the parameter (heat amount) based on each of the ink type, the sheet type and the amount of ink based on the above-described reference information 63. The drying controller 65 drives and controls each of the first heat source 30 and the second heat source 40. Here, the amount of ink ejected onto the sheet P can be calculated based on image data to be printed. The drying controller 65 determines whether or not the calculated amount of ink is larger than a predetermined amount and determines the control parameter based on the reference information 63. The drying controller 65 may determine the control parameter of each of the first heat source 30 and the second heat source 40 based on at least one of the ink type, the sheet type and the amount of ink.

Figure 6:
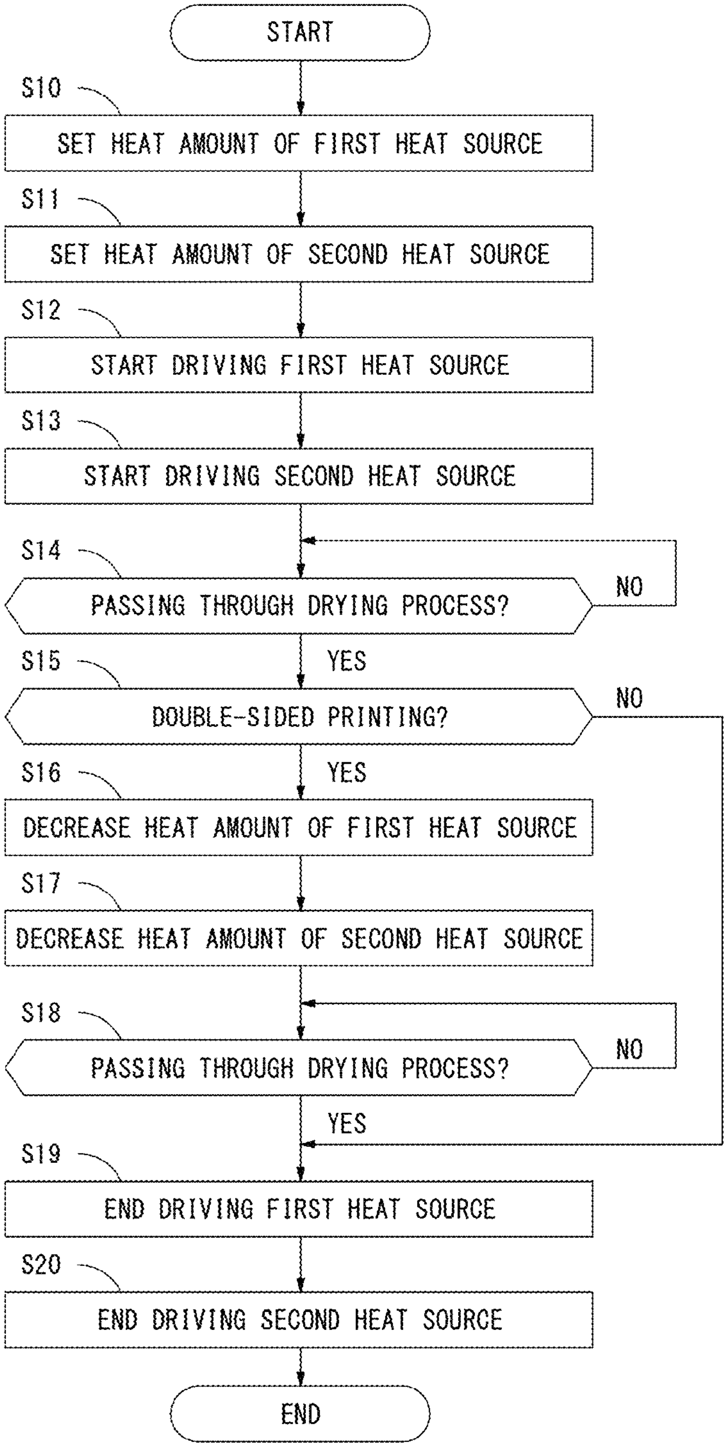
FIG. 6 is a flowchart illustrating an example of a processing procedure performed by the controller.

Next, an example of a detailed control operation performed by the controller 3 is described. FIG. 6 is a flowchart showing an exemplary processing procedure by the controller 3, and mainly shows a processing procedure for controlling the operation of the drying section 7. This process starts, for example, when the controller 3 starts executing a print job. When starting this process, the controller 3 refers to the reference information 63 and determines the amount of heat of the first heat source 30 (step S10). The controller 3 determines the amount of heat of the second heat source 40 (step S11). Then, the controller 3 starts driving the first heat source 30 (step S12) and starts driving the second heat source 40 (step S13). At this time, the controller 3 also starts driving the blower 50. Thus, irradiation of the electromagnetic waves 32 is started in the heating region R1, and heating of the belt 21 is started.

The controller 3 then waits until the sheet P on which the image is formed passes through the drying section 7 (step S14). When the sheet P passes through the drying section 7 (when a result of step S14 is YES), the controller 3 determines whether double-sided printing on the sheet P is specified (step S15). If double-sided printing is specified (when a result of step S15 is YES), the controller 3 decreases the amount of heat of the first heat source 30 (step S16) and also decreases the amount of heat of the second heat source 40 (step S17). In the case of double-sided printing, the sheet P having an image formed on a first side (front side) passes through the drying section 7. After that, the sheet P is conveyed again to the first path 2*a* via the second path 2*b*, and an image is formed on a second side (back side) of the same sheet P. When the sheet P having the image formed on the first surface passes through the drying section 7, the temperature of the sheet P has got higher than the normal temperature. When an image is formed on the second surface of the sheet P, the same amount of heat as that for the first surface may be applied. In such a case, scorching may occur, or ink blisters (air bubbles) may occur. In order to prevent this, the controller 3 reduces the amount of heat of each of the first heat source 30 and the second heat source 40 when ink is ejected onto the second surface during double-sided printing compared to when ink is ejected onto the first surface.

After reducing the amount of heat of each of the first heat source 30 and the second heat source 40, the controller 3 waits until the sheet P having the image formed on the second surface thereof passes through the drying section 7 (step S18). When the sheet P passes through the drying section 7 (when a result of step S18 is YES), the controller 3 ends the driving of the first heat source 30 (step S19) and ends the driving of the second heat source 40 (step S20). When determining in step S15 that double-sided printing is not specified (when a result of step S15 is NO), the controller 3 also performs the processes of steps S18 and S19 and ends the driving of the first heat source 30 and the second heat source 40. Thus, the processing by the controller 3 ends.

FIG. 6 illustrates the processing procedure in the case where a single sheet P is fed from the sheet feed section 4. However, a plurality of sheets P may be continuously fed from the sheet feed section 4. In this case, the controller 3 may repeatedly perform the above-described processing each time the sheet P is fed by the sheet feed section 4.

According to the above-described example, ink can be dried efficiently while normally continuing sheet conveyance without deforming a sheet when drying the ink discharged to the cut sheet.

Second Embodiment

The second embodiment of the present invention is described below. In the first embodiment described above, an example of the structure in which the drying section 7 includes the blower 50 has been described. As described above, the blower 50 prevents the vicinity of the ink ejection face from reaching a saturated vapor amount to promote drying of the ink. Therefore, it is particularly effective in a case where the ink ejected from the ink ejection section 16 is a water-based ink. The ink ejected from the ink ejection section 16 is not limited to a water-based ink. Non-water-based ink may be used. In a case where the ink is a non-water-based ink, the drying section 7 may adopt the structure not including the blower 50 described in the first embodiment. In the second embodiment, such an example of the structure will be described.

Figure 7:
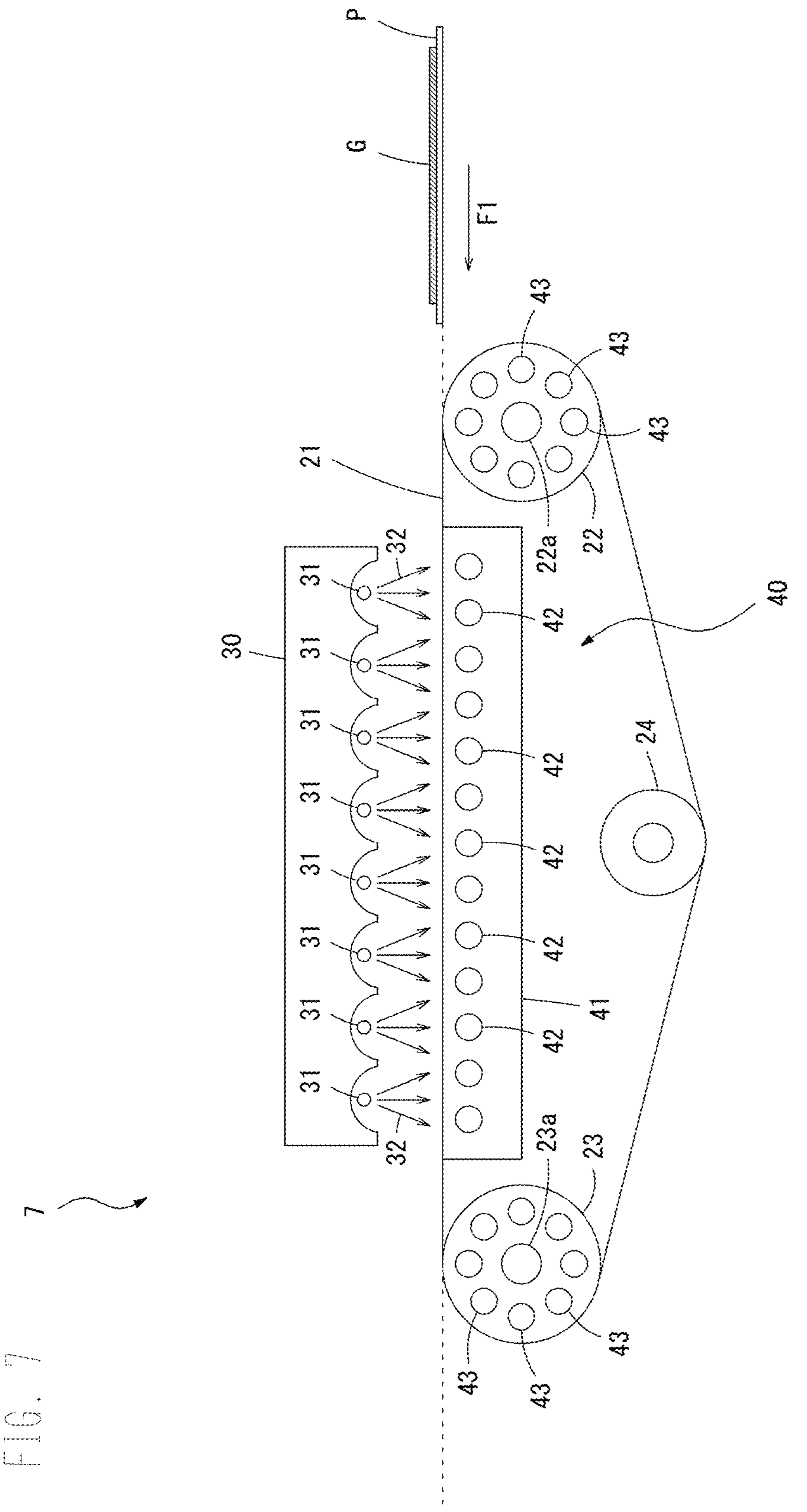
FIG. 7 illustrates another exemplary structure of the drying section.

FIG. 7 is a diagram illustrating an exemplary structure of the drying section 7 in the second embodiment. The drying section 7 illustrated in FIG. 7 does not include the blower 50 and the wall 55 described in the first embodiment. More specifically, the first heat source 30 and the second heat source 40 have substantially the same length in the conveyance direction F1 of the sheet P. According to such a structure, while the sheet P is conveyed by the belt 21, the first heat source 30 can heat the ink ejection face of the sheet P with radiant heat. Also, the second heat source 40 is enabled to heat the back surface of the sheet P by heat conduction through the belt 21. Therefore, instead of the structure of the drying section 7 described in the first embodiment, the structure as shown in FIG. 7 may be employed.

Although the embodiments of the present invention have been described and illustrated in detail, it is clearly understood that the same is by way of illustration and example only and not limitation, the scope of the present invention should be interpreted by terms of the appended claims.

(Modifications)

While the preferred embodiments of the present invention have been described above, the present invention is not limited to the preferred embodiments. Various modifications may be applied to the present invention.

For example, in the above-described embodiments, the exemplary structure in which the inkjet printing apparatus 1 can perform double-sided printing on the sheet P is described. However, the inkjet printing apparatus 1 is not limited to an apparatus capable of performing double-sided printing and may be an apparatus capable of performing only single-sided printing.

For example, in the above-described embodiments, the inkjet printing apparatus 1 capable of enabling the inkjet ejection section 16 to eject ink in multiple colors and to form a color image on the sheet P is described. However, the inkjet printing apparatus 1 is not limited to an apparatus that can form a color image and may be an apparatus that can form only a black and white image.

What is claimed is:

1. An inkjet printing apparatus comprising:

a conveyance section that conveys a cut sheet;

an ink ejection section that ejects an ink to form an image when the sheet passes a predetermined position;

a first heat source that is provided on a downstream side of the ink ejection section and dries an ink ejection face of the sheet; and a second heat source that is arranged to face the first heat source and comes into contact with a back surface of the sheet opposite to the ink ejection face to heat the sheet, a controller that controls an amount of heat applied to the sheet by each of the first heat source and the second heat source, wherein, when the ink is ejected onto the second surface during double-sided printing, the controller reduces the amount of heat of each of the first heat source and the second heat source, wherein the first heat source emits an electromagnetic wave to heat the ink ejection face by radiant heat.

2. The inkjet printing apparatus according to claim 1, wherein the conveyance section includes a belt conveyance section that conveys the sheet by attracting a back surface of the sheet to a front surface of a belt.

3. The inkjet printing apparatus according to claim 2, wherein the second heat source heats the belt and heats the back surface of the sheet by heat conduction from the belt.

4. The inkjet printing apparatus according to claim 3, wherein the second heat source includes a heat source plate that is in contact with the back surface of the belt.

5. The inkjet printing apparatus according to claim 3, wherein the belt is stretched over multiple rollers, and the second heat source heats the roller to heat the belt.

6. The inkjet printing apparatus according to claim 1, wherein the first heat source is a UV heater that emits ultraviolet rays.

7. The inkjet printing apparatus according to claim 1, wherein the first heat source is a halogen heater.

8. The inkjet printing apparatus according to claim 1, wherein the ink ejection section ejects a water-based ink.

9. The inkjet printing apparatus according to claim 1, further comprising:

a blower provided on a downstream side of the first heat source.

10. The inkjet printing apparatus according to claim 9, further comprising:

a wall provided between a heating region by the first heat source and a blowing region by the blower.

11. The inkjet printing apparatus according to claim 1, further comprising:

a controller that controls an amount of heat applied to the sheet by each of the first heat source and the second heat source, wherein the controller determines the amount of heat of each of the first heat source and the second heat source based on at least one of a type of the sheet, an amount of ink ejected to the sheet, and a type of the ink.

12. A sheet drying device comprising:

a conveyance section that conveys a cut sheet in a state in which ink is ejected to a front surface;

a first heat source that heats an ink ejection face of the sheet in a state in which the sheet is being conveyed;

a second heat source that is arranged to face the first heat source and is in contact with a back surface of the sheet opposite to the ink ejection face to heat the sheet, wherein the first heat source emits an electromagnetic wave to heat the ink ejection face by radiant heat; and a controller that controls an amount of heat applied to the sheet by each of the first heat source and the second heat source, wherein, when the ink is ejected onto the second surface during double-sided printing, the controller reduces the amount of heat of each of the first heat source and the second heat source.

13. A sheet drying method comprising:

conveying a cut sheet in a state in which an ink ejection face to which ink is ejected faces upward;

driving a first heat source arranged above the ink ejection face of the sheet to heat the ink ejection face of the sheet in a state in which the sheet is being conveyed;

driving a second heat source that is arranged to be in contact with a back surface of the sheet opposite to the ink ejection face to heat the back surface of the sheet in a state in which the sheet is being conveyed, wherein the first heat source emits an electromagnetic wave to heat the ink ejection face by radiant heat; and controlling, by a controller, an amount of heat applied to the sheet by each of the first heat source and the second heat source, wherein, when the ink is ejected onto the second surface during double-sided printing, the controller reduces the amount of heat of each of the first heat source and the second heat source.

* * * * *